United States Patent
Banhos et al.

(10) Patent No.: US 11,913,348 B1
(45) Date of Patent: Feb. 27, 2024

(54) GAS TURBINE ENGINE VANE AND SPAR COMBINATION WITH VARIABLE AIR FLOW PATH

(71) Applicant: Raytheon Technologies Corporation, Farmington, CT (US)

(72) Inventors: Jonas Banhos, West Hartford, CT (US); James T. Roach, Vernon, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 17/964,355

(22) Filed: Oct. 12, 2022

(51) Int. Cl.
*F01D 25/12* (2006.01)
*F01D 9/04* (2006.01)
*F01D 5/18* (2006.01)

(52) U.S. Cl.
CPC ............. *F01D 25/12* (2013.01); *F01D 5/186* (2013.01); *F01D 5/187* (2013.01); *F01D 5/188* (2013.01); *F01D 5/189* (2013.01); *F01D 9/041* (2013.01); *F05D 2220/32* (2013.01); *F05D 2240/12* (2013.01); *F05D 2260/20* (2013.01)

(58) Field of Classification Search
CPC .......... F01D 25/12; F01D 5/186; F01D 5/187; F01D 5/188; F01D 5/189; F01D 9/041; F05D 2220/32; F05D 2240/12; F05D 2260/20
See application file for complete search history.

(56) References Cited

U.S. PATENT DOCUMENTS

| | | | | |
|---|---|---|---|---|
| 9,777,635 B2* | 10/2017 | Bergholz | ............... | F01D 5/18 |
| 9,982,543 B2* | 5/2018 | Spangler | ............... | F01D 5/188 |
| 11,149,568 B2 | 10/2021 | Whittle et al. | | |
| 11,365,635 B2 | 6/2022 | Read et al. | | |
| 2006/0120868 A1* | 6/2006 | Dorling | ............... | F01D 5/187 |
| | | | | 416/97 R |
| 2012/0328450 A1* | 12/2012 | Spangler | ............... | F01D 5/187 |
| | | | | 416/97 R |
| 2014/0060084 A1* | 3/2014 | Gregg | ............... | F04D 29/582 |
| | | | | 415/115 |
| 2016/0032730 A1* | 2/2016 | Thomen | ............... | F01D 11/08 |
| | | | | 29/889.721 |
| 2017/0081966 A1* | 3/2017 | Huizenga | ............... | F01D 9/041 |
| 2020/0024972 A1* | 1/2020 | Freeman | ............... | F01D 11/02 |
| 2020/0080434 A1* | 3/2020 | Thomas | ............... | F01D 5/282 |
| 2020/0248567 A1* | 8/2020 | Whittle | ............... | F01D 5/18 |
| 2020/0340363 A1* | 10/2020 | Whittle | ............... | F01D 11/006 |
| 2021/0108524 A1* | 4/2021 | Whittle | ............... | F01D 9/042 |
| 2021/0123352 A1* | 4/2021 | Townes | ............... | B33Y 80/00 |

* cited by examiner

*Primary Examiner* — Brian Christopher Delrue
(74) *Attorney, Agent, or Firm* — Carlson, Gaskey & Olds, P.C.

(57) ABSTRACT

A gas turbine engine stator vane combination includes a stator vane body having an airfoil with a leading edge, a trailing edge, a suction side and a pressure side, and having at least one internal cooling channel. The stator vane body is formed of ceramic matrix composite materials. A spar is received within the at least one cooling air channel and formed of a metal. The spar has an outer peripheral surface spaced from an inner peripheral surface of the cooling air channel to define a cooling air path, with the cooling air path having a varying cross-sectional area through the cooling air channel. A gas turbine engine is also disclosed.

9 Claims, 6 Drawing Sheets

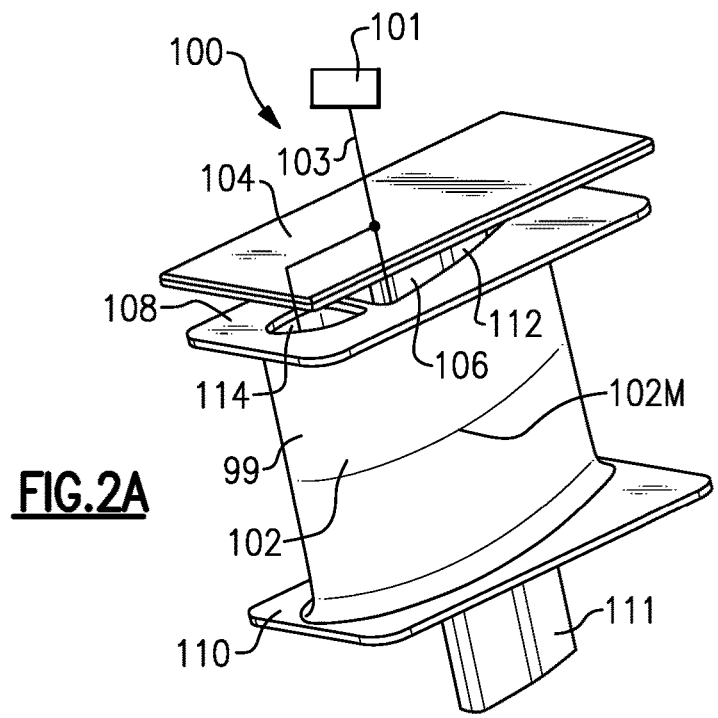
FIG.2A
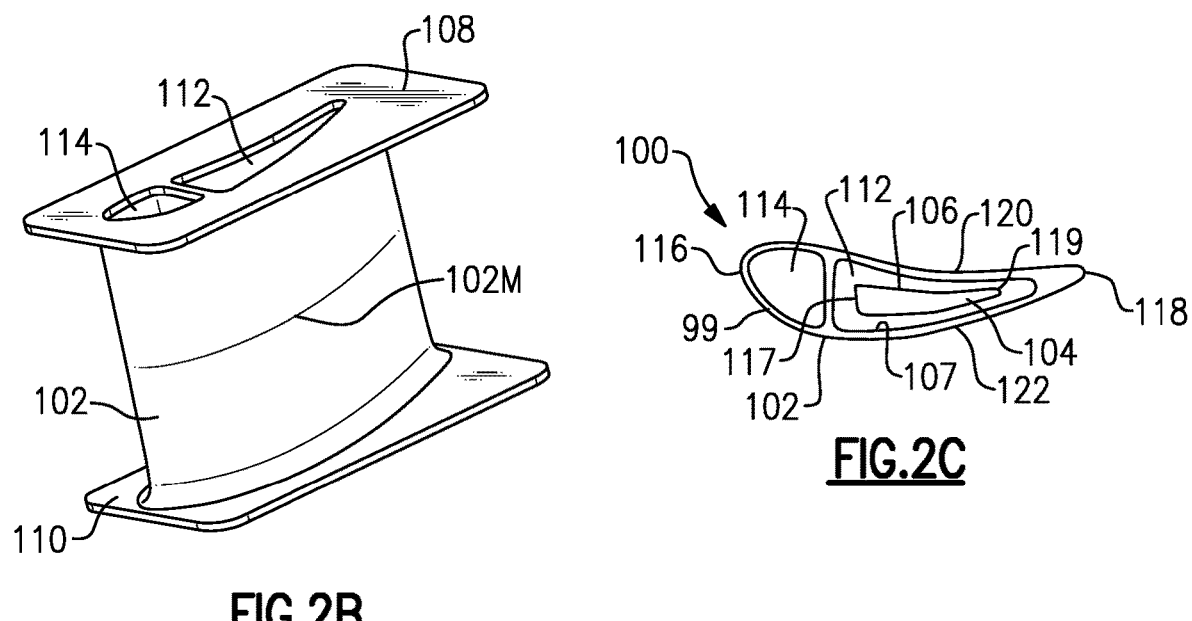
FIG.2B
FIG.2C

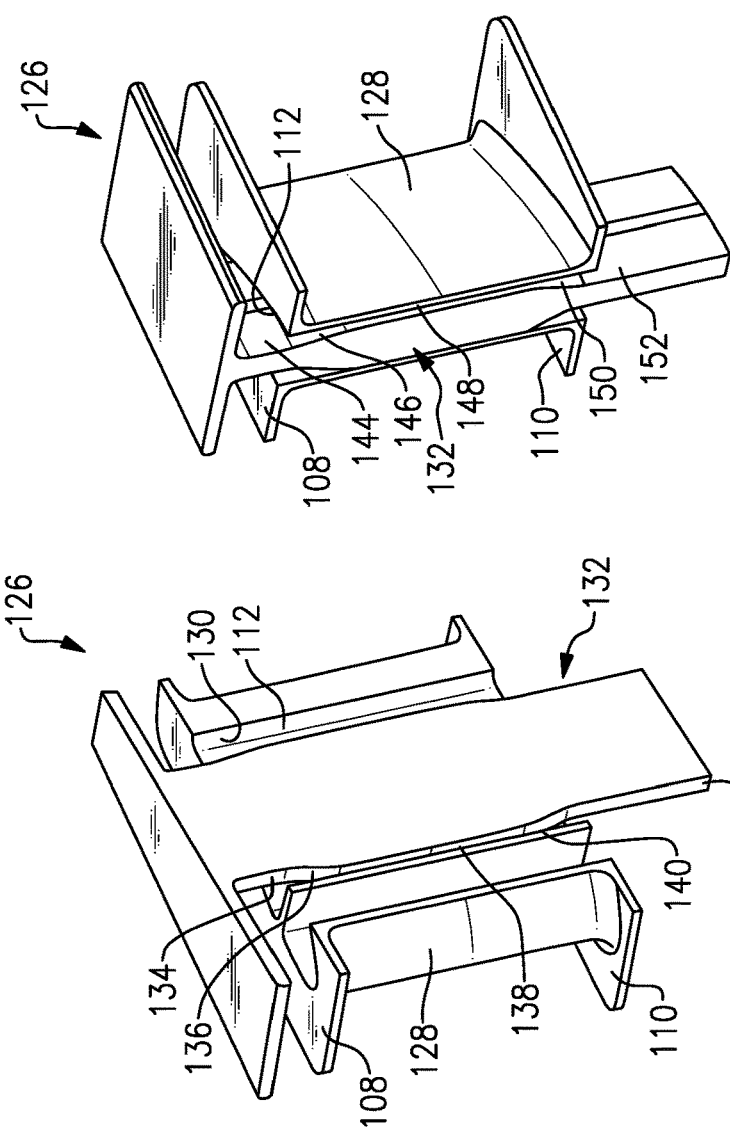

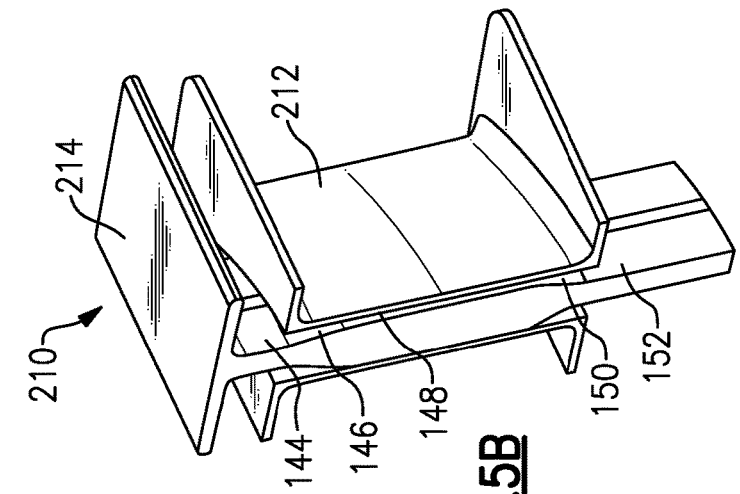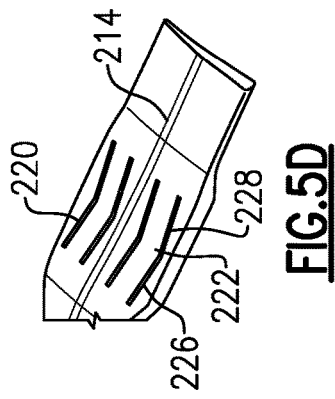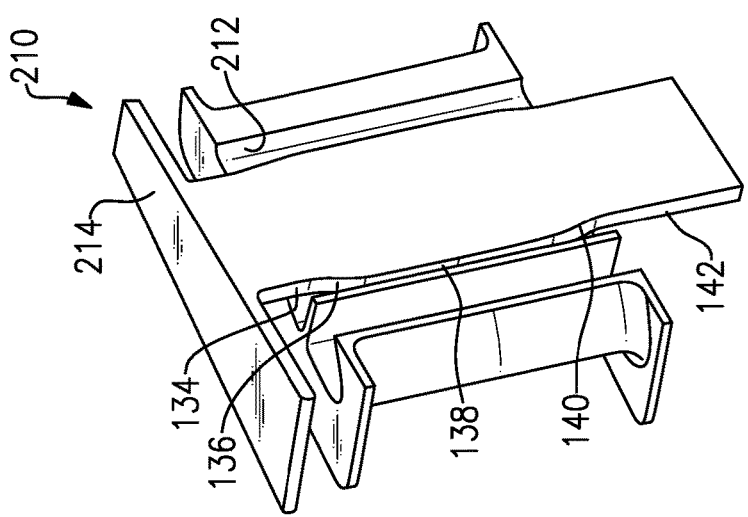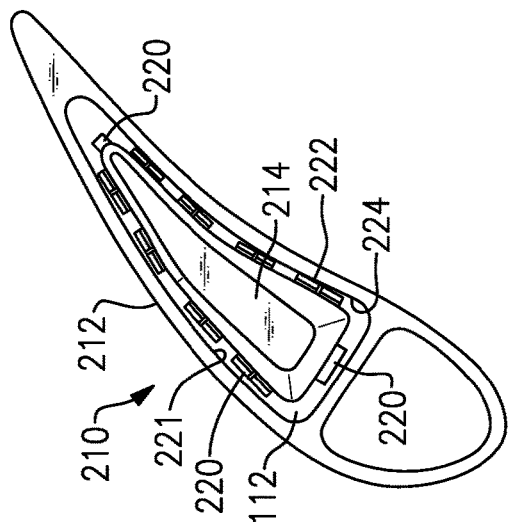

GAS TURBINE ENGINE VANE AND SPAR COMBINATION WITH VARIABLE AIR FLOW PATH

BACKGROUND OF THE INVENTION

This application relates to a vane for use in a gas turbine engine which includes an internal spar, and defining a cooling air flow path with an inner surface of the vane.

Gas turbine engines are known, and typically include a fan delivering air into a bypass duct as propulsion air. Air is also delivered into a compressor where it is compressed and delivered into a combustor. In the combustor the air is mixed with fuel and ignited. Products of this combustion pass downstream over turbine rotors, driving them to rotate. The turbine rotors drive the fan and compressor rotors.

As is known, the turbine section of a gas turbine engine sees very high temperatures. As such, various steps are taken to ensure components in the turbine section can survive the high temperatures. One recent development is the use of ceramic matrix composites ("CMC") for components in the turbine section. One such component is a stator vane, which are mounted circumferentially spaced in rows that are axially intermediate rotating turbine blade rows.

A CMC vane typically has an internal metal spar providing additional structural support. An outer surface of the spar defines a cooling air flow path in combination with an inner surface of a cooling channel in the CMC stator body.

SUMMARY OF THE INVENTION

In a featured embodiment, a gas turbine engine stator vane combination includes a stator vane body having an airfoil with a leading edge, a trailing edge, a suction side and a pressure side, and having at least one internal cooling channel. The stator vane body is formed of ceramic matrix composite materials. A spar is received within the at least one cooling air channel and formed of a metal. The spar has an outer peripheral surface spaced from an inner peripheral surface of the cooling air channel to define a cooling air path, with the cooling air path having a varying cross-sectional area through the cooling air channel.

In another embodiment according to the previous embodiment, the stator vane body has platforms at each of two radial ends of the airfoil, and the spar extends through the cooling air channel and beyond each of the platforms.

In another embodiment according to any of the previous embodiments, the spar has a leading edge end, a trailing edge end, a suction wall face and a pressure wall face all associated with corresponding structure on the stator vane body. A first axial distance is defined between the front edge end and the aft edge end of the spar. A second axial distance is defined between the leading edge of the stator vane body and the trailing edge of the stator vane body and the first distance being between 10 and 90% of the second distance.

In another embodiment according to any of the previous embodiments, the variable cross-sectional area is achieved by the spar having a variation in the outer peripheral surface, with a thinner portion leading into an outwardly first ramped portion at each of the leading edge, the trailing edge, the suction wall face and the pressure wall face of the spar to change the cross-sectional area.

In another embodiment according to any of the previous embodiments, there is a second ramped portion beyond the enlarged portion that ramps back to a thinner portion such that the cross-sectional area of the cooling air path decreases at the first ramped portion and increases at the second ramped portion.

In another embodiment according to any of the previous embodiments, there are enlarged surface portions formed in the cooling air path to further provide a reduction in cross-sectional area of the cooling air path at localized areas.

In another embodiment according to any of the previous embodiments, the enlarged surface portions are formed on the inner peripheral surface of the stator vane body.

In another embodiment according to any of the previous embodiments, the enlarged surface portions are formed on the outer peripheral surface of the spar.

In another embodiment according to any of the previous embodiments, the enlarged surface portions have ramped portions leading from thinner portions into thicker portions to vary the cross-sectional area.

In another embodiment according to any of the previous embodiments, the enlarged surface portions have discrete steps to change the cross-sectional area.

In another embodiment according to any of the previous embodiments, the enlarged surface portions are formed on the inner surface of the stator vane body.

In another embodiment according to any of the previous embodiments, there are enlarged surface portions formed in the cooling air path to provide a reduction in cross-sectional area of the cooling air path at localized areas.

In another embodiment according to any of the previous embodiments, the enlarged portions have ramped portions leading from thinner portions into thicker portions to vary the cross-sectional area.

In another embodiment according to any of the previous embodiments, the enlarged portions have discrete steps to change the cross-sectional area.

In another embodiment according to any of the previous embodiments, the enlarged surface portions are formed on the outer peripheral surface of the spar.

In another embodiment according to any of the previous embodiments, the enlarged surface portions are formed on the inner surface of the stator vane body.

In another featured embodiment, a gas turbine engine includes a compressor section, a combustor section and a turbine section. The turbine section has alternating rows of rotating turbine blades, and rows of stator vanes, with at least one row of the stator vanes being formed of ceramic matrix composite materials. The stator vanes have a stator vane body having an airfoil with a leading edge, a trailing edge, a suction side and a pressure side, and having at least one internal cooling channel. The stator vane body is formed of ceramic matrix composite materials. A spar is received within the at least one cooling air channel and formed of a metal. The spar has an outer peripheral surface spaced from an inner peripheral surface of the cooling air channel to define a cooling air path, with the cooling air path having a varying cross-sectional area through the cooling air channel.

In another embodiment according to any of the previous embodiments, the spar has a leading edge end, a trailing edge end, a suction wall face and a pressure wall face all associated with corresponding structure on the stator vane body. A first axial distance is defined between the front edge and the aft edge end of the spar. A second axial distance is defined between the leading edge of the stator vane body and the trailing edge of the stator vane body and the first distance being between 10 and 90% of the second distance.

In another embodiment according to any of the previous embodiments, the variable cross-sectional area is achieved by the spar having a variation in the outer surface with there being a thinner portion leading into an outwardly ramped portion at each of the front edge, the aft edge, the suction wall face and the pressure wall face of the spar to change the cross-sectional area.

In another embodiment according to any of the previous embodiments, there are enlarged surface portions formed in the cooling air path to provide a reduction in cross-sectional area of the cooling air path at localized areas.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 2A shows a stator vane.
FIG. 2B shows a stator vane body.
FIG. 2C is a cross-sectional view through the FIG. 2A stator vane and spar combination.
FIG. 3A shows a first embodiment stator vane and spar combination.
FIG. 3B shows an additional view of the FIG. 3A combination.
FIG. 3C is a top view looking into the embodiment of FIGS. 3A and 3B.
FIG. 5A shows yet another embodiment stator vane and spar combination.
FIG. 5B shows another view of the FIG. 5A combination.
FIG. 5C is a view looking downward into a cooling channel of the FIG. 5A and 5B embodiment.
FIG. 5D shows yet another feature of the FIG. 5A-5C embodiment.

DETAILED DESCRIPTION

Figure 1:
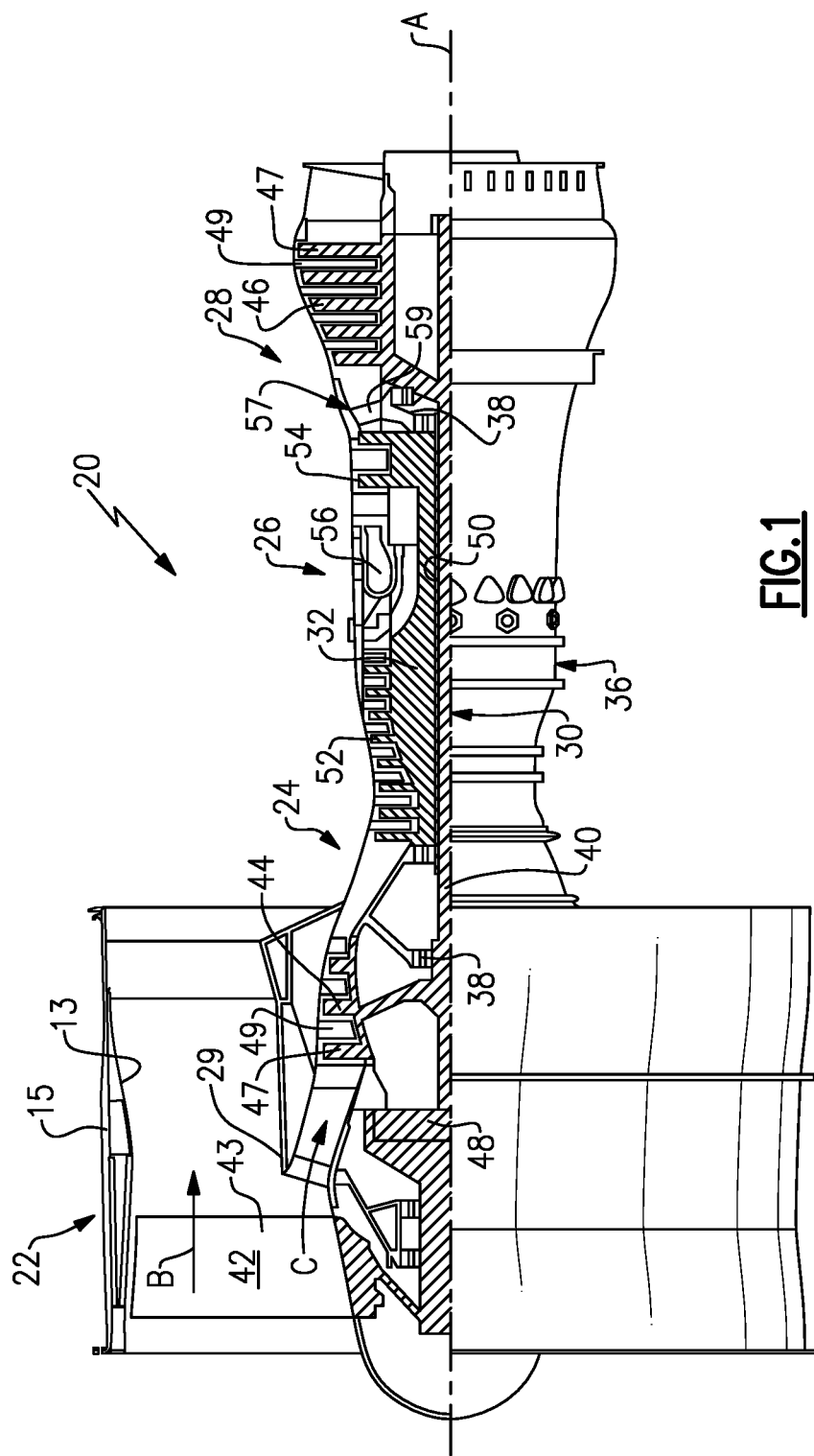
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°R)]^{0.5}$. The corrected fan tip speed can be less than or equal to 1150.0 ft/second (350.5 meters/second), and can be greater than or equal to 1000.0 ft/second (304.8 meters/second).

FIG. 2A shows a stator vane body 102 and an internal spar 104 as a combined element 100. Stator vanes typically include platforms 108 and 110 at opposed ends of an airfoil 99. Applicant has discovered that the heating load on the airfoil 99 is not uniform, and may be highest adjacent a midspan 102M.

The stator vane body 102 may be formed of ceramic matrix composites ("CMCs").

In embodiments, the ceramic matrix components could be formed of CMC material or a monolithic ceramic. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

As mentioned above, there is a cooling channel 112 that receives cooling air from a source 101 such as a compressor section in the FIG. 1 engine. The air is delivered through conduits 103 into a cooling channel 112 and, optionally, into a second cooling channel 114. Of course, additional cooling channels may be used. The internal spar 104 may be formed of an appropriate metal, and provides additional structural ability to the combination 100. As shown, the spar 104 has a remote end 111 which extends beyond the platform 110. An outer surface 106 of the spar 104 is generally shaped as an airfoil.

Spar 104 is illustrated in a schematic manner to show the cooling features. The actual spar may itself have internal cooling passages. Further, its outer shape may differ. Also, some attachment structure will typically be included.

FIG. 2B shows the cooling channels 112 and 114 extending through the stator vane body 102.

FIG. 2C shows a cross-section through the combination 100. In particular, the spar 104 has its outer surface 106 spaced away from an inner surface 107 of the stator vane body 102. Between the surfaces 107 and 106 a cooling air path is defined.

The stator vane body 102 has a leading edge 116 and a trailing edge 118. Spar 104 has a front edge 117 and an aft edge 119. In an embodiment, a length measured between the front edge 117 and aft edge 119 is greater than or equal to 10% and less than or equal to 90% of a distance measured between leading edge 116 and trailing edge 118. In other embodiments it may be greater than or equal to 20% and less than or equal to 80% of the distance. In further embodiments, it may be greater than or equal to 40% and less than or equal to 90% of the distance.

As mentioned above, Applicant has recognized that the cooling load is not constant along the surfaces 120 or 122. Applicant also has recognized that there may be localized hot spots especially adjacent a midspan location 102M.

FIG. 3A shows a combination 126 with structure to "focus" cooling on localized areas that are most in need. As shown, the spar 132 has a front edge that varies in thickness from a relatively small portion 134 to a ramped portion 136 that leads to an enlarged area 138, and back to a ramped portion 140 that leads to the end 142 of the spar 132. The aft edge has a similar series of changes in its length.

FIG. 3B shows the combination 126, and the spar 132 also having similarly small outer portions 144 leading into a ramped portion 146, and enlarged portion 148, another ramped portion 150 and a smaller end portion 152. While this is shown on the suction side of the stator vane body 128 a similar shape would be found on the pressure side. As mentioned above, there is a cooling path defined between the outer surface of the spar 132 and an inner surface of the channel 112.

FIG. 3C shows the front edge 300 and the aft edge 303 of the spar 132 through a section taking at the point where the thinner portion 140 merges into the ramped portion 146. As can be appreciated, due to the ramped portions found along each of the pressure and suction sides, and adjacent the front and aft edges, the cross-sectional area defined between the outer surface of the spar 132 and the inner surface 122 of the channel 112 will decrease as the cooling air moves toward a midspan region. This will increase the velocity of the air flow, and result in more concentrated cooling along this midspan portion.

Figure 4B:
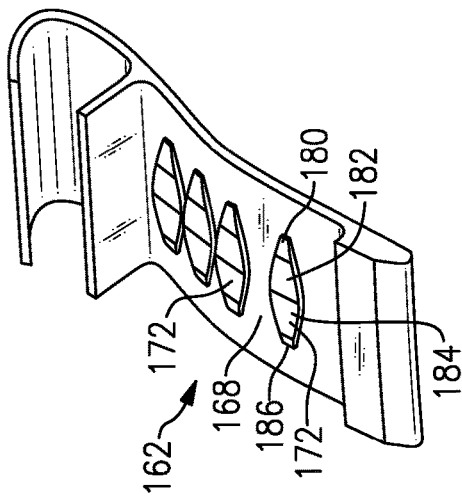
FIG. 4B shows a detail of the FIG. 4A embodiment.
Figure 4D:
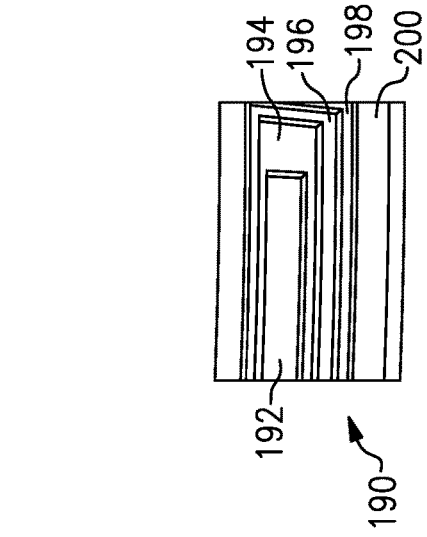
FIG. 4D shows an alternative embodiment of the FIG. 4A combination.
Figure 4A:
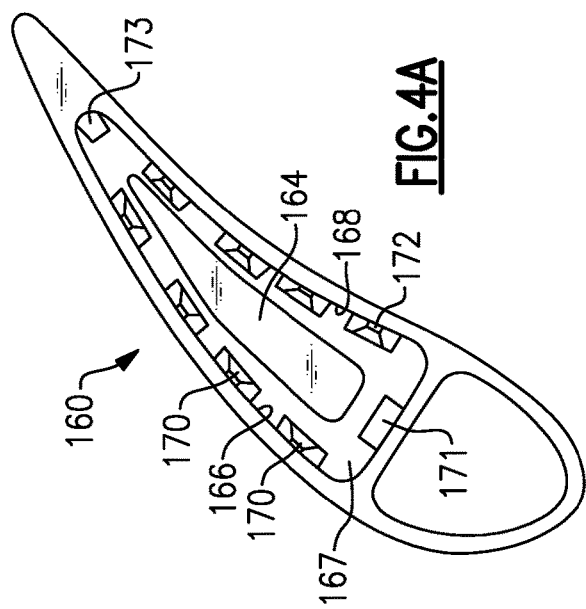
FIG. 4A shows another embodiment stator vane and spar combination.

FIG. 4A shows another embodiment 160 where the spar 164 may have a relatively constant outer shape, but an inner surface 166 of the channel 167 has ridges or steps 170, 171, 172 and 173 formed along the suction side, leading edge, pressure side and trailing edge, respectively.

As can be seen in FIG. 4B, the steps or ramps 172 will decrease the cross-sectional area of the flow adjacent a midspan area 168 by having a ramp portion 186 leading into thicker portions 182 and 184, and to another ramp 180.

Figure 4C:
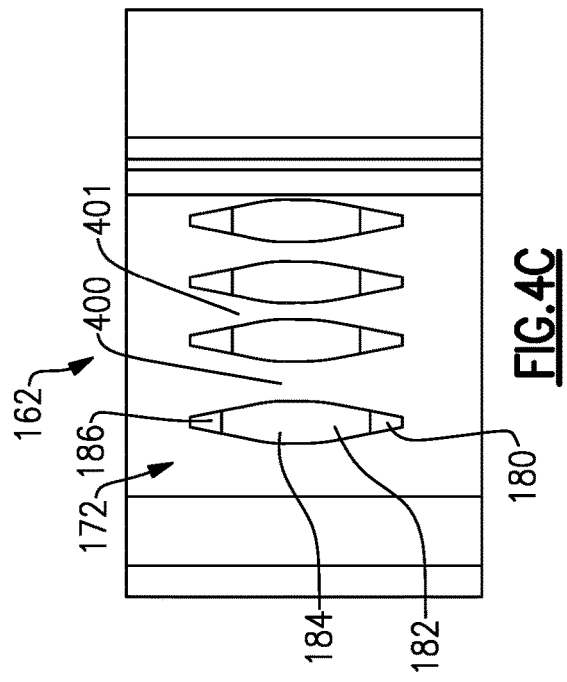
FIG. 4C shows a further detail of an inner wall of this embodiment.

As shown in FIG. 4C, the ridges or steps 172 need not be spaced by a constant axial distance. Instead, there is a greater axial distance between adjacent ramps 172 as shown at 400 compared to a distance shown at 401 between the ridges or steps 172. This can allow further tailoring of the cooling air flow to specific areas.

FIG. 4D shows an alternative embodiment wherein the ridges or steps 190 are formed by a plurality of discrete incremental steps 192/194/196/198 away from the inner surface 200. This is in contrast to the ramped increases as shown in FIGS. 4A-4C. It may be easier to manufacture such a shape on the CMC stator body 162.

FIG. 5A shows an embodiment 210 having a stator vane body 212 where the spar 214 again has the surfaces 134/136/138/140/142 adjacent both the front edge and an aft edge.

FIG. 5B shows that the combination 210 includes surfaces on the spar 214 such as previously described in FIG. 3B, and in particular surfaces 140/146/148/150 and 152.

However, as shown in FIG. 5C, the spar 214 has additional ridges or steps 220 similar to those found in the embodiment of FIGS. 4A-4C, but now on the spar 214. As can be seen in FIG. 5D, the steps 220 have a chevron shape with a ramped portion 226 leading into a thicker portion 222 and then into another ramp portion 228 such that the flow cross-section varies along a length of the spar 214.

Figure 6A:
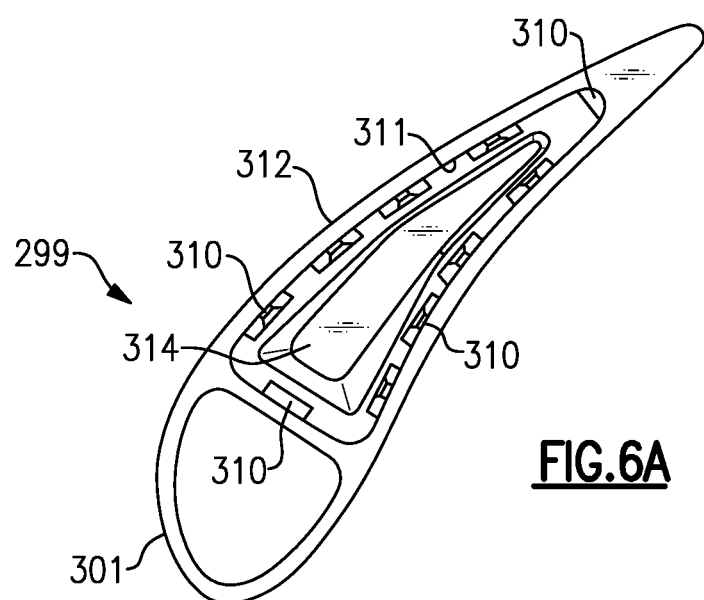
FIG. 6A shows another embodiment stator vane and spare combination.

FIG. 6A shows yet another embodiment 299 which essentially combines a spar 314 which may be similar to the FIG. 3A-3C spar. In addition, a stator vane body 301 has ridges or steps 310 extending from an inner surface 311.

Figure 6B:
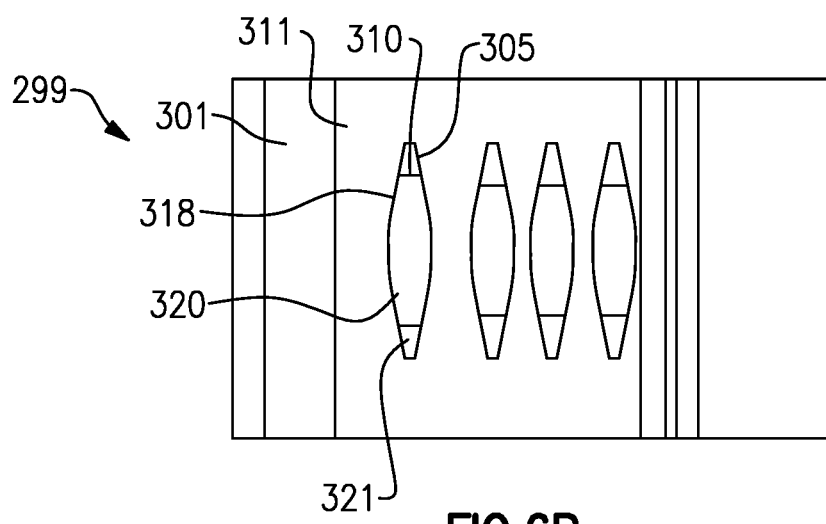
FIG. 6B shows a detail of the FIG. 6A embodiment.

FIG. 6B shows the steps 310 on the body 301, and again show the ramps 305 leading into outwardly extending sections 318, inwardly extending sections 320 and another ramped portion 314. Essentially, this embodiment combines the features of the FIGS. 3A-3C and FIGS. 4A-4C, or 4D.

Now, the several embodiments can be utilized to provided localized cooling to an area of the stator vane body which is most in need of cooling airflow.

While embodiments have been disclosed, a worker of skill in this art would recognize that modifications within the scope of this disclosure. For that reason, the following claims should be studied to determine the true scope and content of this disclosure.

What is claimed is:

1. A gas turbine engine stator vane combination comprising:
   a stator vane body having an airfoil with a leading edge, a trailing edge, a suction side and a pressure side, and having at least one internal cooling channel, said stator vane body being formed of ceramic matrix composite materials;
   a spar received within said at least one internal cooling channel and formed of a metal, and said spar having an outer peripheral surface spaced from an inner peripheral surface of the at least one internal cooling channel to define a cooling air path, with said cooling air path having a varying cross-sectional area through the at least one internal cooling channel;
   wherein said variable cross-sectional area is achieved by said spar having a variation in said outer peripheral surface, with a thinner portion leading into an outwardly first ramped portion at each of said leading edge, said trailing edge, said suction wall face and said pressure wall face of said spar to change the cross-sectional area; and
   wherein there is a second ramped portion beyond said enlarged portion that ramps back to a thinner portion such that the cross-sectional area of the cooling air path decreases at the first ramped portion and increases at the second ramped portion.

2. The gas turbine engine stator vane as set forth in claim 1, wherein there are enlarged surface portions formed in said cooling air path to further provide a reduction in cross-sectional area of the cooling air path at localized areas.

3. The gas turbine engine stator vane as set forth in claim 2, wherein said enlarged surface portions are formed on the outer peripheral surface of said spar.

4. The gas turbine engine stator vane as set forth in claim 2, wherein said enlarged surface portions have ramped portions leading from thinner portions into thicker portions to vary the cross-sectional area.

5. The gas turbine engine stator vane as set forth in claim 2, wherein said enlarged surface portions have discrete steps to change the cross-sectional area.

6. The gas turbine engine stator vane as set forth in claim 1, wherein said enlarged portion extending across an entire circumference of the spar.

7. A gas turbine engine comprising:
   a compressor section, a combustor section and a turbine section, said turbine section having alternating rows of rotating turbine blades, and rows of stator vanes, with at least one row of said stator vanes being formed of ceramic matrix composite materials;
   said stator vanes having a stator vane body having an airfoil with a leading edge, a trailing edge, a suction side and a pressure side, and having at least one internal cooling channel, said stator vane body being formed of ceramic matrix composite materials;
   a spar received within said at least one internal cooling channel and formed of a metal, and said spar having an outer peripheral surface spaced from an inner peripheral surface of the at least one internal cooling channel to define a cooling air path, with said cooling air path having a varying cross-sectional area through the at least one internal cooling channel;
   the varying cross-sectional area being achieved by a plurality of enlarged portions extending from the outer peripheral surface of the spar or an inner peripheral surface of the stator vane body, and said stator vane body inner periphery being spaced from said spar outer periphery at said enlarged portion such that the cooling air path extends along said plurality of enlarged portions; and wherein said plurality of enlarged portions are achieved by said spar having a variation in said outer surface with there being a thinner portion leading into an outwardly ramped portion at each of said leading edge, said trailing edge, a suction wall face and a pressure wall face of said spar to change the cross-sectional area.

8. The gas turbine engine as set forth in claim 7, wherein said spar has a leading edge end, a trailing edge end, a suction wall face and a pressure wall face and a first axial distance defined between said leading edge and said trailing edge end of said spar, and a second axial distance defined between said leading edge of said stator vane body and said trailing edge of said stator vane body and said first axial distance being between 10 and 90% of said second axial distance.

9. The gas turbine engine as set forth in claim 7, wherein said enlarged portion extending across an entire circumference of the spar.

* * * * *